United States Patent
Azais et al.

(10) Patent No.: US 9,633,799 B2
(45) Date of Patent: Apr. 25, 2017

(54) LONG-TERM ENERGY STORAGE ASSEMBLY COMPRISING AN INTERMEDIATE CONNECTION PART

(75) Inventors: Philippe Azais, Saint Egreve (FR); Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 118 days.

(21) Appl. No.: 14/241,441

(22) PCT Filed: Aug. 29, 2012

(86) PCT No.: PCT/EP2012/066733
§ 371 (c)(1),
(2), (4) Date: Feb. 26, 2014

(87) PCT Pub. No.: WO2013/030213
PCT Pub. Date: Mar. 7, 2013

(65) Prior Publication Data
US 2014/0368972 A1    Dec. 18, 2014

(30) Foreign Application Priority Data

Aug. 29, 2011    (FR) ...................................... 11 57605

(51) Int. Cl.
*H01G 11/82* (2013.01)
*H01G 11/18* (2013.01)
(Continued)

(52) U.S. Cl.
CPC ............... *H01G 11/82* (2013.01); *H01G 9/12* (2013.01); *H01G 11/18* (2013.01); *H01G 11/84* (2013.01); *Y02E 60/13* (2013.01); *Y10T 29/417* (2015.01)

(58) Field of Classification Search
CPC ........ H01G 11/82; H01G 11/18; H01G 11/84; H01G 9/12; Y10T 29/417
See application file for complete search history.

(56) References Cited

U.S. PATENT DOCUMENTS

| 1,723,727 A | 3/1927 | Eckstein |
| 3,150,300 A | 9/1964 | Schils et al. |

(Continued)

FOREIGN PATENT DOCUMENTS

| DE | 42 13 651 A1 | 10/1993 |
| EP | 2 110 824 A1 | 10/2009 |

(Continued)

OTHER PUBLICATIONS

Non-Final Office Action in U.S. Appl. No. 14/241,439 mailed Nov. 4, 2015. 19 pages.

(Continued)

*Primary Examiner* — David M Sinclair
(74) *Attorney, Agent, or Firm* — Blakely Sokoloff Taylor & Zafman LLP

(57) ABSTRACT

The invention relates to an electrical energy storage assembly comprising an envelope and a capacitive element (30) contained in the envelope, said envelope comprising: at least one side wall (22); and two bottom walls (41) each located at an end of the side wall. Said storage assembly comprises at least one electroconductive intermediate connection part (50) to be arranged between the capacitive element and a bottom wall (41), in addition to a covering plate (51) for covering the end of the capacitive element (20), said covering plate (51) including at least one vent (53) for the passage of a fluid. The covering plate (51) is fixed to the capacitive element in such a way as to be in electrical contact therewith, and the intermediate connection part (50) is also fixed to the envelope in certain areas enabling a deformation of the bottom wall in relation to the intermediate connection part.

11 Claims, 3 Drawing Sheets

(51) Int. Cl.
 *H01G 11/84* (2013.01)
 *H01G 9/12* (2006.01)

(56) References Cited

U.S. PATENT DOCUMENTS

| | | | |
|---|---|---|---|
| 3,386,014 A | 5/1968 | Burger et al. | |
| 4,581,306 A | 4/1986 | Hasenauer et al. | |
| 6,456,484 B1* | 9/2002 | Matsuoka | H01G 9/06 361/502 |
| 6,605,382 B2* | 8/2003 | Ruth | H01M 2/0285 429/161 |
| 8,568,915 B2 | 10/2013 | Fuhr et al. | |
| 2005/0054240 A1 | 3/2005 | Kubota et al. | |
| 2007/0053140 A1* | 3/2007 | Soliz | H01G 2/02 361/502 |
| 2007/0084043 A1 | 4/2007 | Hosking | |
| 2008/0182168 A1 | 7/2008 | Byun et al. | |
| 2009/0104516 A1 | 4/2009 | Yoshihara et al. | |
| 2009/0123830 A1 | 5/2009 | Kato et al. | |
| 2009/0208836 A1 | 8/2009 | Fuhr et al. | |
| 2010/0079927 A1* | 4/2010 | Shimizu | H01G 9/08 361/519 |
| 2011/0038101 A1* | 2/2011 | Caumont | H01G 9/12 361/502 |
| 2011/0081568 A1 | 4/2011 | Kim et al. | |
| 2011/0236733 A1* | 9/2011 | Lee | H01G 9/016 429/53 |
| 2012/0114989 A1 | 5/2012 | Caumont et al. | |
| 2012/0218680 A1* | 8/2012 | Wetherill | H01G 11/70 361/502 |
| 2012/0236466 A1* | 9/2012 | Iida | H01G 11/06 361/502 |
| 2013/0149919 A1 | 6/2013 | Lee et al. | |

FOREIGN PATENT DOCUMENTS

| | | |
|---|---|---|
| FR | 2 894 381 A1 | 6/2007 |
| FR | 2 916 306 A1 | 11/2008 |
| FR | 2 921 195 A1 | 3/2009 |
| FR | 2 921 203 | 3/2009 |
| FR | 2 927 729 A1 | 8/2009 |
| JP | 2000149907 A | 5/2000 |
| JP | 2003133715 A | 5/2003 |
| JP | 2004171856 A | 6/2004 |
| WO | WO 2005/061171 A1 | 7/2005 |
| WO | WO-2007064089 A1 | 6/2007 |
| WO | WO-2010041461 A1 | 4/2010 |
| WO | WO-2011111721 A1 | 9/2011 |

OTHER PUBLICATIONS

Search Report in International Application No. PCT/EP2012/066732 dated Sep. 28, 2012. 13 pages.
Search Report in International Application No. PCT/EP2012/066733 dated Sep. 25, 2012. 13 pages.
Non-Final Office Action in U.S. Appl. No. 14/241,440, mailed Mar. 21, 2016. 20 pages.
Final Office Action in U.S. Appl. No. 14/241,439 dated May 24, 2016. 14 pages.

* cited by examiner

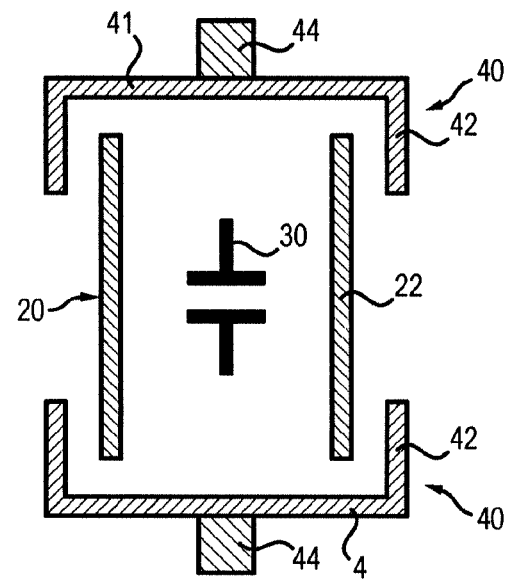
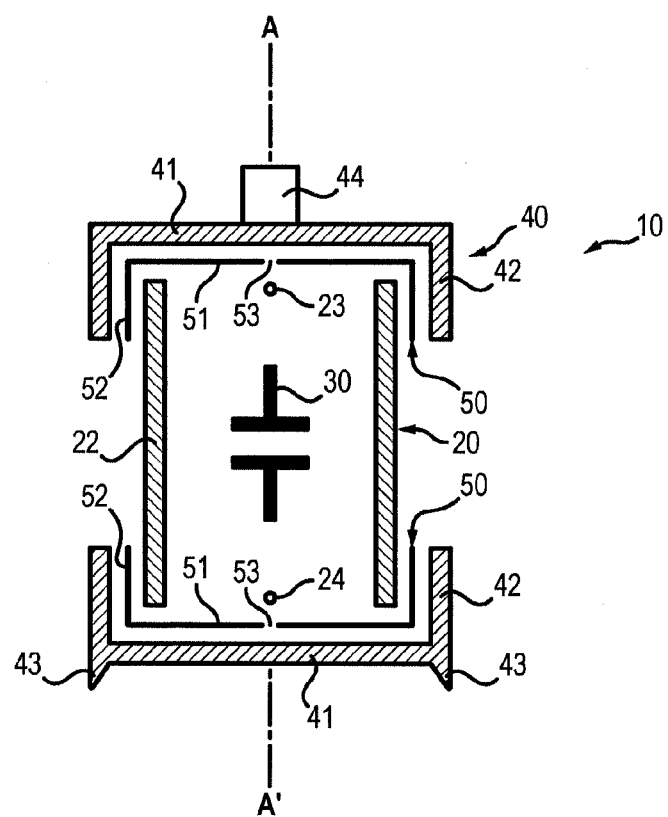

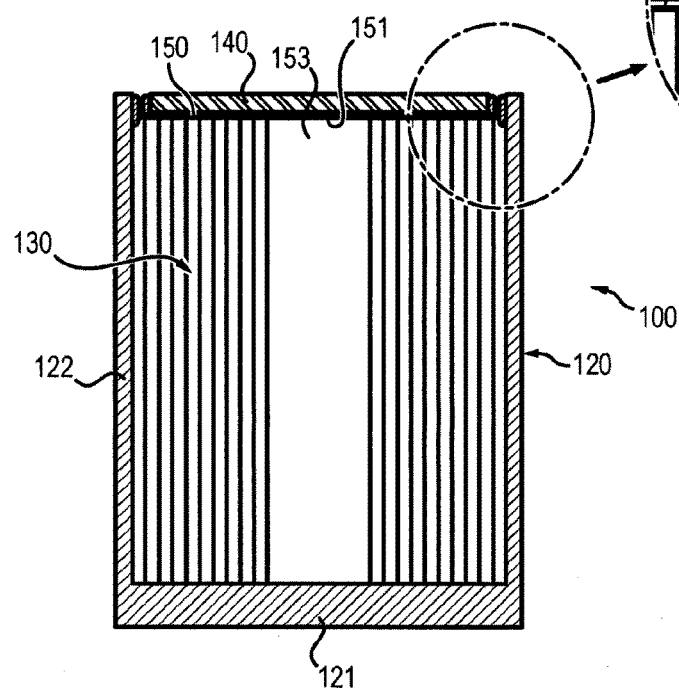
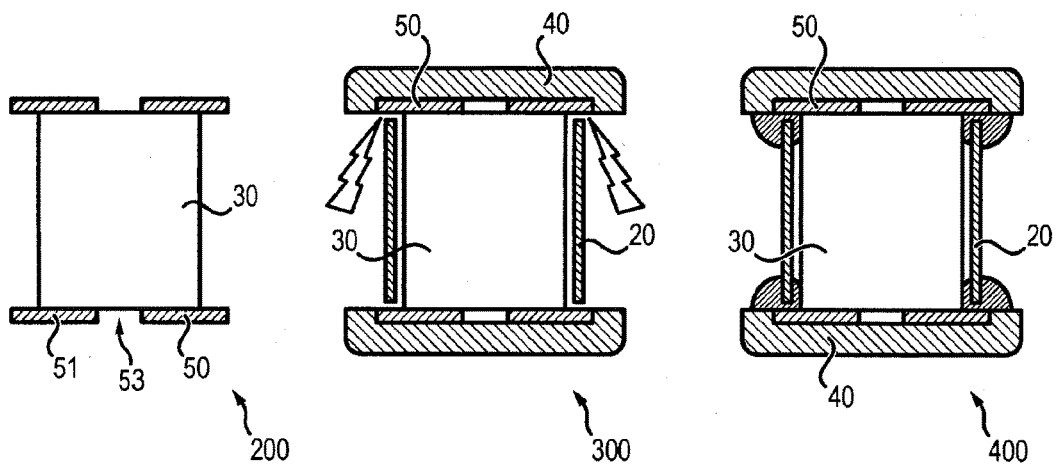

LONG-TERM ENERGY STORAGE ASSEMBLY COMPRISING AN INTERMEDIATE CONNECTION PART

DESCRIPTION

The present invention concerns the general technical field of electrical energy storage assemblies.

In the present invention by <<electrical energy storage assembly>> is meant either a capacitor (i.e. a passive system comprising two electrodes and an insulator) or a supercapacitor (i.e. a system comprising at least two electrodes, an electrolyte and at least one separator) or a battery of lithium battery type (i.e. a system comprising at least one anode, at least one cathode and an electrolyte solution between the anode and the cathode).

GENERAL PRESENTATION OF THE PRIOR ART

FIG. 1 illustrates an example of an energy storage assembly of tubular supercapacitor type. This storage assembly 10 comprises a tubular casing 20 open at its two ends, a capacitive winding 30 and a liquid electrolyte contained in the tubular casing 20, and two covers 40 intended to cap the open ends of the tubular element 20. Each cover is electrically connected to the capacitive winding along weld lines extending essentially over the entire visible surface of the cover.

To weld a cover 40 onto the capacitive winding 30, it is necessary to guarantee perfect contact between the cover 40 and the capacitive winding 30. Strong pressure is therefore applied onto the cover 40 during the welding step of the cover 40 onto the capacitive winding 30.

During the welding step, the temperature of the component parts of the storage assembly 10 increases, which leads to expansion of these parts.

At the end of the welding step, the temperature of the component parts of the storage assembly 10 decreases which leads to contraction of these parts.

This deformation of the parts—and in particular of the cover 40—causes stresses on the welds which may generate a reduction in the lifetime of the energy storage assemblies 10 thus obtained.

In addition, over the course of its ageing, the inner pressure of an energy storage assembly increases due to the release of gas (mostly hydrogen) inside the energy storage assembly.

This rise in pressure has a tendency to deform the cover associated with the energy storage assembly (the cover becoming convex) which may cause rupture of the welds between the cover and the capacitive winding.

The increase in the inner pressure of a storage assembly may therefore generate a shortening of its lifetime.

It is one objective of the present invention to propose a solution to the aforementioned problems in order to increase the lifetime of energy storage assemblies.

PRESENTATION OF THE INVENTION

For this purpose, an electrical energy storage assembly is provided comprising an envelope and a capacitive element contained in the envelope, the envelope comprising:
  at least one side wall,
  two bottom walls each located at one end of the side wall, noteworthy in that the storage assembly further comprises at least one electrically conductive intermediate connection part intended to be arranged between the capacitive element and one of the bottom walls, said intermediate connection part having a covering plate intended to cover the end of the capacitive element, said covering plate including at least one vent for the passing of a fluid, the covering plate being secured to the capacitive element and to the envelope so as to be in electrical contact with the capacitive element and the envelope, the intermediate connection part being in contact with the envelope in securing regions in which the deformation of the bottom wall in relation to the intermediate connection part is minimum.

The intermediate connection part therefore allows swelling of the supercapacitor in the event of an overpressure without the connections with the capacitive element or the capacitive element itself being damaged. Since the connection part allows fluids to pass, air in particular, and since it is joined so as to allow the bottom wall to deform in relation thereto, the connection part is able to remain in place even if the envelope becomes deformed.

Preferred but non-limiting aspects of the storage assembly according to the invention are the following:
  the intermediate connection part is therefore devoid of (i.e. does not comprise) securing regions in the central part of the covering plate. By <<central part>> is meant that part of the plate that is the image of the plate by homothecy with a ratio of at least 0.5, preferably 0.8. The periphery of the plate is that part of the plate not belonging to the central part;
  said securing regions may particularly comprise a surface extending on the periphery of the covering plate of the intermediate connection part;
  in one particular embodiment, the intermediate connection part also comprises a peripheral border extending over the periphery of the covering plate, the peripheral border being intended partly to cover the side wall, the securing regions comprising a surface extending over the peripheral border of the intermediate connection part. This embodiment is particularly advantageous since the bottom wall is absolutely not connected to the plate which allows maximisation of the possible deformation of this bottom wall without damaging the connection between the capacitive element and the envelope;
  the intermediate connection part is preferably secured to the envelope by gluing or welding. It could also be secured by brazing, screwing or any other securing means;
  the envelope comprises a tubular element forming the side wall and at least one cover placed at one end of the tubular element, the cover comprising a covering wall intended to cover the end of the tubular element and forming a bottom wall of the envelope;
  the intermediate connection part is arranged so that the covering plate extends parallel to a plane in which the covering wall of the cover extends, the intermediate connection part being connected to the cover and to the tubular element in securing regions in which the deformation of the covering wall of the cover in relation to the intermediate connection part is minimum, and preferably being in electrical contact with the cover. The cover then forms a terminal of the supercapacitor;
  the tubular element may also comprise a base closing the side wall at one of its ends and forming a bottom wall, the cover being positioned at the other of its ends. In this case, the intermediate connection part can be arranged so that its peripheral border is placed inside the side wall of the envelope, the covering plate extending parallel to a plane in which the base extends. The securing regions of the intermediate connection part then preferably comprise a surface located on the peripheral border and connected to an inner surface of the side wall;

it can also be envisaged that at least one cover comprises a peripheral skirt intended partly to surround the side wall of the tubular element. In this case, the intermediate connection part may be arranged so that its peripheral border is located between the side wall and the peripheral skirt. The securing regions of the intermediate connection part then preferably have a surface located on the peripheral border and connected to an inner face of the skirt of the cover and/or an outer face of the side wall;

in another embodiment, at least one cover is formed of a covering wall, that in particular is essentially planar, sized so that its dimensions are smaller than those of the end of the side wall so that it can be pressed into the envelope, the intermediate connection part being arranged so that its covering plate extends parallel to the covering wall of the cover and its peripheral border is positioned between the periphery of the end wall and the side wall. Preferably, the securing regions of the intermediate connection part comprise a surface located on the peripheral border of the connection part and connected to the periphery of the wall forming the cover and/or to an inner surface of the side wall;

it is noted that all combinations of the previously described embodiments are possible. For example an energy storage assembly may comprise a cover of a first type and a cover of a second type, two covers of one same type or a cover and a tubular element comprising a base;

the assembly may comprise two intermediate connection parts, each positioned at one end of the capacitive element. The connection parts may have a different configuration and/or be connected to a bottom wall of different types;

the assembly may also comprise a first bottom wall of narrower thickness than the other bottom wall, the intermediate connection part being positioned between the capacitive element and the first bottom wall. In this manner, it can be ensured that the deformation of the envelope in the event of overpressure is only taken into account on one side, the side on which the bottom wall is thinnest. The economy is then made of an intermediate connection part whilst avoiding damage to the connections between the capacitive element and the envelope, this also allowing simplification of the assembling method of the assembly;

at least one vent consists of a through opening;

the intermediate connection part comprises at least one projection extending outwardly perpendicular to the covering plate and in the same direction as the peripheral border, the projection preferably being intended to be embedded in the capacitive element;

each projection comprises a curved free end;

the covering plate is directly secured to the capacitive element at its surface in contact with the capacitive element in particular at its winding forming the capacitive element. In one preferred embodiment, the edges of the collectors are welded onto the surface of the covering plate in contact with the winding.

The invention also concerns a method for assembling an electrical energy storage assembly comprising an envelope having a so-called side wall and two bottom walls each located at one end of the side wall, in addition to a capacitive element intended to be contained in the envelope, noteworthy in that the method comprises at least the following steps:

first positioning an electrically conductive intermediate connection part on the capacitive element, the intermediate connection part comprising a covering plate including at least one vent for the passing of a fluid, the intermediate connection part being positioned so that the covering plate covers the end of the capacitive element, and joining the covering plate to the capacitive element in particular by welding;

secondly positioning an envelope part comprising a bottom wall of the envelope, in particular a cover, on the intermediate connection part, and joining the intermediate connection part to the envelope part so as to allow deformation of the bottom wall relative to the intermediate connection part, in particular by gluing, brazing or welding;

these steps being performed so that the intermediate connection part is placed between the capacitive element and the bottom wall.

The foregoing steps of the method can be conducted in any order, the positioning and connecting of the connection part possibly being performed first on the capacitive element and then on the envelope or the reverse.

The method may also comprise a securing step of another part of the envelope onto the assembled capacitive element, intermediate connection part and envelope part, this other part of the envelope possibly being secured in particular directly onto the intermediate connection part.

The invention also concerns a module comprising a casing in which there are arranged at least two electrical energy storage assemblies conforming to the electrical energy storage assembly described above.

PRESENTATION OF THE FIGURES

Other characteristics objectives and advantages of the present invention will become further apparent from the following description which is solely illustrative and non-limiting and is to be read with reference to the appended drawings in which:

FIG. 1 illustrates one embodiment of a prior art storage assembly;

Figure schematically illustrates a variant of embodiment of an energy storage assembly;

FIG. 6 is a cross-sectional view of an assembly according to another embodiment of the invention, FIG. 7 illustrates an example of a method for assembling an energy storage assembly.

DESCRIPTION OF THE INVENTION

Figure 3:
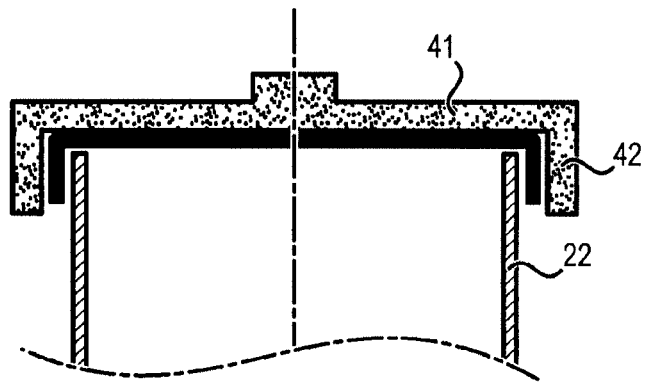
FIG. 3 is a partial view of an energy storage assembly without inner pressure.

A description will now be given of different embodiments of the storage assembly according to the invention with reference to the Figures. In these different Figures equivalent elements of the storage assembly carry the same reference numbers.

As illustrated in FIG. 2, the storage assembly comprises an envelope comprising in particular a tubular element 20 with two covers 40, and a capacitive element 30 in the tubular element 20.

The storage assembly 10 is of globally cylindrical shape. In other variants not illustrated herein the storage assembly may be of parallelepiped, cubic, oval, hexagonal shape without this modifying the general principles of the invention.

The tubular element 20 may be open at its two ends, or it may comprise a base. In the embodiment illustrated in FIG. 2, each tubular element 20 comprises a side wall 22 forming the side wall of the envelope, and two openings at its upper and lower ends. The tubular element 20 may have a square, oval, hexagonal circular cross-section or any other type of cross-section known to persons skilled in the art.

The constituent material of the tubular element 20 may be electrically insulating e.g. in plastic, or electrically conductive e.g. a metal such as aluminium, stainless steel etc.

Each open face of the tubular element 20 is capped by a cover 40.

The cover 40 is electrically conductive. The constituent material of the cover 40 is a metal for example such as aluminium, stainless steel etc.

Each cover 40 is composed of:
- a covering wall 41 forming a bottom wall of the assembly and intended to cover the upper face 23 (respectively lower face 24) of the storage assembly 10; and
- a peripheral skirt 42 extending perpendicular to the covering wall 41, the peripheral skirt 42 being intended partly to surround the side wall 22 of the tubular element 20.

Each cover 40 may or may not comprise a peripheral edge 43 extending outwardly parallel to the axis of revolution A-A' of the storage assembly 10 on its surface opposite the peripheral skirt 42. It is noted that the peripheral edge of each cover is evidently optional.

Each cover 40 may or may not comprise a connection terminal 44 intended to receive a connector strip (not illustrated) to connect the storage assembly 10 electrically with an adjacent storage assembly.

Advantageously the storage assembly 10 also comprises an electrically conductive intermediate connection part 50. The intermediate connection part 50 guarantees the passing of current between the capacitive element 30 and the cover 40.

The intermediate connection part 50 comprises a covering plate 51 and a peripheral border 52.

The covering plate 51 extends substantially along a plane. This covering plate 51 is intended to cover the open end of the tubular element 20.

The peripheral border 52 extends over the periphery of the covering plate 51, perpendicular to the covering plate 51. This peripheral border 52 is intended partly to cover the side face 22 of the tubular element 20.

The intermediate connection part 50 is intended to be arranged between the tubular element 20 and the cover 40 so that:
- the covering wall 41 of the cover 40 covers the covering plate 51 of the intermediate part, the covering wall 41 extending parallel to the covering plate 51; and
- the peripheral skirt 42 of the cover 40 covers the peripheral border 52 of the intermediate connection part 50, the peripheral skirt 42 extending parallel to the peripheral border 52.

Once the storage assembly 10 is assembled, the intermediate connection part 50 is in electrical contact with the capacitive element 30 and with the cover 50.

The intermediate connection part 50 is secured to the capacitive element 30 at the covering plate 51. It is also secured to the cover in a region allowing deformation of the covering wall of the cover which forms a bottom wall of the assembly, in relation to the connection part, in particular on the periphery of the covering plate 51 or on the skirt 52.

The covering plate 51 also comprises a vent 53 for the passing of a fluid. This prevents the intermediate connection part 50 from being affected by an increase in the inner pressure of the energy storage assembly 10 over the course of its aging, since the swelling of the cover is permitted without this damaging the electrical connection between the cover and the capacitive element.

By transferring the passing of current onto an intermediate connection part 50 whose deformations are limited through the presence of a vent 53, the lifetime of the energy storage assembly 10 is improved.

The risks of disconnection related to a rise in inner pressure of the energy storage assembly 10 are reduced, the intermediate connection part 50 being scarcely subjected to the inner pressure of the energy storage assembly 10.

The presence of an intermediate connection part has numerous advantageous.

In particular, in prior art storage assemblies the covers 40 were secured onto the capacitive element 30 using a transparent laser welding technique. By transparent laser welding is meant that two superimposed parts are welded using an energy beam passing through one of the parts to be welded—either through a thinned part thereof of the part is thick or through its entire thickness if the part is thin.

This led to numerous stresses on the covers. In particular the covers had to be of constant thickness and planar.

In addition a thinned region was often provided on these covers, a region at which the cover was transparent welded onto the capacitive element.

Finally, the chosen constituent material of the cover had to be compatible with the transparent welding operation.

With the presence of the intermediate connection part it is possible to eliminate this transparent welding step, an operation which is particularly tricky notably on account of the differences in thickness between the cover 40 and the capacitive element 30.

Since the assembling of the storage assembly 10 no longer requires a welding step of the cover 40 onto the capacitive element 30, it is possible:
- no longer to provide thinned regions on the cover;
- to reduce the constraints of constant thickness and planarity of the cover;
- to extend the choice of constituent aluminium of the cover towards more mechanical alloys such as series 3000 aluminium (manganese-based) or 6000 (containing magnesium and silicon) or even stainless steel, nickel or any other metal which does not corrode in an aqueous medium.

The intermediate connection part 50 can be secured onto the cover 40 in regions in which the amplitude of deformation is minimum e.g. on the periphery of the cover 40. This allows the guaranteed good electrical contact between the intermediate connection part 50, the cover 40, even when the inner pressure of the storage assembly 10 is increased.

The intermediate connection part 50 can be secured onto the capacitive element 30 by welding.

Advantageously the thickness of the intermediate connection part 50 can be close to that of the capacitive element 30, for example a thickness of the order of 1 millimeter.

This makes it possible:

- to reduce the power of the laser beam used for welding the intermediate connection part 50 onto the capacitive element 30;
- to increase the weld speed of the intermediate connection part 50 onto the capacitive element 30;
- to reduce heating of the capacitive element 30 and hence to reduce the risk of deterioration thereof (for example reduced risk of degradation of the polymers and separator forming the capacitive element);
- to widen the weld beads between the intermediate connection part 50 and the capacitive element 30, which will improve the passing of current;
- to weld the outer turns of the, capacitive element 30 (if it is a capacitive winding).

The intermediate connection part 50 may also be secured onto the capacitive element 30 by brazing or diffusion brazing since it does not need to be sealed and is not subjected to mechanical stresses (in particular increased inner pressure of the storage assembly).

Figure 4:
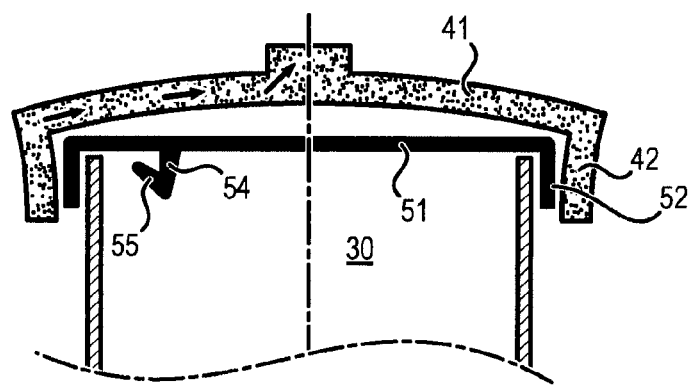
FIG. 4 is a partial view of an energy storage assembly with inner pressure.

Finally, the intermediate connection part can be mechanically secured onto the capacitive element 30 as illustrated in FIG. 4.

In this embodiment, the intermediate connection part comprises at least one projection 54 extending perpendicular to the covering plate 51 in the same direction as the peripheral border 52. The free end 55 of the projection 54 can be curved to facilitate its anchoring in the capacitive element 30.

The reader will appreciate that the securing of the intermediate connection part onto the capacitive element may combine the three aforementioned securing techniques (welding, brazing, mechanical).

Regarding the securing of the intermediate connection part 50 onto the cover 40, this can be obtained by welding or gluing.

Figure 5:
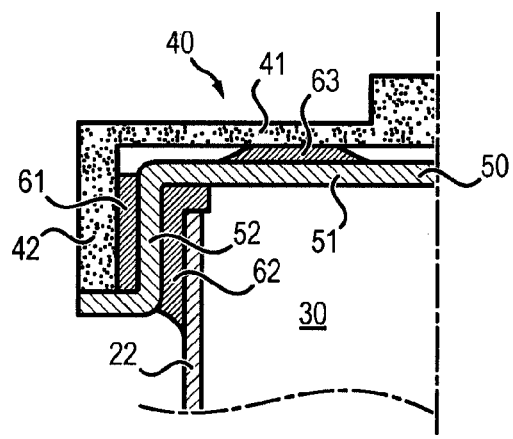
FIG. 5 is a partial view of another variant of embodiment of an energy storage assembly.

FIG. 5 illustrates an embodiment of the energy storage assembly 10 in which the intermediate connection part 50 is secured by gluing onto the cover 40 and tubular element 20.

By gluing the cover 40 and the intermediate connection part 50 it is possible to improve the pressure resistance of the storage assembly. It is therefore possible to reduce the thickness of the cover 40.

The storage assembly comprises three glue deposits 61, 62, 63. A first glue deposit 61 extends between the peripheral skirt 42 of the cover. 40 and the peripheral border 52 of the intermediate connection part 50. A second glue deposit 62 extends between the peripheral border and the side wall 22 of the tubular element 20. The deposits 61, 62 are preferably continuous beads of glue which can ensure the sealing of the supercapacitor.

Therefore the intermediate connection part 50 is secured:
- to the cover over a surface radially normal to the cover; and
- to the tubular element over a radially normal surface to the cover.

A third glue deposit 63 extends between the covering wall 41 of the cover 40 and the covering plate 51 of the intermediate connection part 50, preferably on the periphery of the covering wall, this region being little subjected to a rise in pressure. The deposit 63 may be in the form of a pad of glue since it is not involved in the sealing of the supercapacitor. This makes it possible to limit the stresses of axial expansion undergone by the intermediate connection part and at the same time by the capacitive element, whilst ensuring good sealing of the assembly.

It will be noted that the securing of the intermediate part with the different other elements can be performed differently. For example it can be envisaged to weld the intermediate part with the cover between the radial ends of the cover 42 and the intermediate part.

With reference to FIG. 6 another embodiment of the invention is illustrated. FIG. 6 shows a supercapacitor 100 comprising an envelope composed of a tubular element 120 having a base 121 forming a bottom wall of the envelope, a cylindrical side wall 122 and a cover 140 placed at one open end of the tubular element 120 and forming another bottom wall of the envelope. The supercapacitor 100 also comprises a wound capacitive element 130 contained in the envelope with an electrolyte.

In this embodiment, the cover 140 is formed of an essentially planar disc whose diameter is slightly smaller than the diameter of the side wall 122 of the tubular element. The cover is intended to be inserted in the tubular element and to lie flush with the end of the tubular element.

The assembly also comprises an intermediate connection part 150 positioned between the cover forming a bottom wall and the capacitive element 130.

This intermediate connection part comprises a covering plate 151 intended to be positioned parallel to the cover 140 and a peripheral border 152 extending at the end of the covering plate 151. The peripheral border is intended to run along the side wall 122 of the tubular element, and the intermediate connection part is configured so that the peripheral border is inserted between the side wall 122 and the end of the cover 140.

The intermediate connection part 150 also comprises a vent 153 allowing the passing of fluids.

The capacitive element is joined by welding both to the base 121 of the tubular element 120 and to the intermediate connection part 150 at the covering plate 151.

The connection part 150 is also joined by gluing to the tubular element 120 at its peripheral border by means of glue deposits 161 to join the tubular element with the connection part and by welding to the cover. This joining by welding 162 allows an electrically conductive join to be obtained to connect the cover electrically with the capacitive element.

In this manner, in the event of overpressure in the envelope, the gases present in the supercapacitor pass through the intermediate connection part 150 via the vent 153 and cause the cover 140 to swell. The electrical connection between the cover and the capacitive element is not damaged since the overpressure has no effect on the connection between the intermediate connection part 150 and the capacitive element 130 due to the presence of the vent, and the swelling of the cover 140 does not damage the connection between the intermediate connection part and the cover since the stresses due to swelling are minor on the periphery of the cover.

It will be noticed in this embodiment that the supercapacitor only comprises one intermediate connection part. Since the base 121 is much thicker than the cover 140, it does not become deformed in the event of overpressure and it is not necessary to make provision for an intermediate connection part between the base and the capacitive element. A said connection part may also be placed in the vicinity of a tubular element base.

With reference to FIG. 7 an example is also illustrated of a method for assembling a storage assembly according to the invention.

If the tubular element 120 does not comprise a base, an intermediate connection part 50 is arranged on each of the ends of the capacitive element 130 (step 200). The intermediate connection part 50 is positioned so that the covering plate 51 caps the end of the capacitive element 130. In this embodiment, the intermediate connection part does not have a peripheral border. The intermediate connection part 50 is then secured onto the capacitive element 30 by welding, by brazing or by mechanical securing in the central part of the covering plate.

A cover 40 is then superimposed over each intermediate connection part 50 (step 300). The tubular element is also placed in position around the capacitive element. The cover 40 is secured to the intermediate connection part 50 by gluing, welding or press-fitting the cover 40 onto the intermediate connection part 50, on the periphery of the covering plate.

Next the tubular element 20 is secured onto the cover in particular via the collector cup (step 400). This securing is notably obtained by gluing and ensures the sealing of the assembly.

The assembly is then generally impregnated by placing the electrolyte inside the envelope via an opening provided in the cover.

An electrical energy storage assembly is thus obtained.

The reader will have understood that numerous modifications can be made to the method and to the device described in the foregoing without departing in substance from the novel teachings and advantages described herein.

In particular, the capacitive element may be a wound, coiled or stacked element. It may be of cylindrical or prismatic shape or any other shape known to those skilled in the art.

In addition, when implementing the method it will also be noted that the intermediate connection part may first be assembled onto the cover (or the base of the tubular element) and then onto the capacitive element.

Therefore any modifications of this type lie within the scope of the module according to the invention such as defined in the appended claims.

The invention claimed is:

1. An electrical energy storage assembly comprising an envelope and a capacitive element contained in the envelope, the envelope comprising a tubular element forming a side wall and
two bottom walls each positioned at one end of the side wall, the envelope also comprising at least one cover placed at one end of the tubular element, said cover comprising a covering wall intended to cover the end of the tubular element and forming one of the two bottom walls of the envelope,
wherein the storage assembly further comprises at least one electrically conductive intermediate connection part, said intermediate connection part having a covering plate provided with at least one through opening forming a vent for the passing of a fluid, the periphery of said covering plate comprising a peripheral skirt perpendicular to said covering plate, wherein said intermediate connection part is arranged between the capacitive element and the cover such that its covering plate extends parallel to a plane along which the covering wall of the cover extends and its peripheral skirt covers a part of the side wall of the envelope, said covering plate being intended to cover and being secured to the end of the capacitive element, so that it is in electrical contact with the capacitive element, wherein the covering plate is devoid of securing regions with the cover of the envelope, and wherein the peripheral skirt of the intermediate connection part is secured by securing regions to the side wall of the envelope and to the cover so as to be in electrical contact with them, said securing regions being regions in which the deformation of the bottom wall relative to the intermediate connection part is minimum.

2. The energy storage assembly according to claim 1, wherein the intermediate connection part is secured to the envelope and/or to the cover by gluing or welding.

3. The storage assembly according to claim 1, wherein the tubular element comprises a base closing the side wall at one of its ends and forming one of the two bottom walls, the cover being placed at the other of its ends.

4. The storage assembly according to claim 1 wherein the intermediate connection part is arranged inside the side wall of the envelope, the covering plate extending parallel to a plane along which the base of the envelope extends, the securing regions of the intermediate connection part preferably comprising a surface located on the peripheral skirt of said intermediate connection part and connected to an inner surface of the side wall.

5. The storage assembly according to claim 1, wherein the cover comprises a peripheral skirt intended partly to surround the outer surface of the side wall of the tubular element.

6. The storage assembly according to claim 5, wherein the intermediate connection part is arranged so that its peripheral skirt is positioned between said side wall of the envelope and the peripheral skirt of the cover, the securing regions of the intermediate connection part comprising a surface located on said peripheral skirt of the intermediate connection part and connected to an inner surface of the skirt of the cover and to an outer surface of the side wall of the envelope.

7. The storage assembly according to claim 1 or 2, wherein the covering wall of the cover is sized to have smaller dimensions than the end of the side wall of the envelope so that it can be pressed into the envelope, the intermediate connection part being arranged so that its covering plate extends parallel to the covering wall of the cover, and so that its peripheral skirt is positioned between an edge of the cover extending perpendicular to the covering wall of the cover and the inner surface of the side wall of the envelope, the securing regions of the intermediate connection part comprising a surface located on the peripheral skirt of the intermediate connection part.

8. The storage assembly according to claim 1, comprising two intermediate connection parts each positioned at one end of the capacitive element.

9. The energy storage assembly according to claim 1, wherein the intermediate connection part comprises at least one projection extending outwardly perpendicular to the covering plate and in the same direction as its peripheral skirt, this projection being intended to be embedded in the capacitive element.

10. A module comprising a casing in which there are arranged at least two electrical energy storage assemblies according to claim 1.

11. A method for assembling an electrical energy storage assembly comprising an envelope having a so-called side wall and two bottom walls each positioned at one end of the side wall, and a capacitive element intended to be contained in the envelope,
wherein the method comprises at least the following steps:
first positioning an electrically conductive intermediate connection part on the capacitive element, the intermediate connection part comprising a covering plate including at least one through opening for the passing of a fluid and a peripheral skirt extending on the periphery of the covering plate and perpendicular to said covering plate, the intermediate connection part being positioned so that thefts covering plate covers the end of the capacitive element, its peripheral skirt covers a part of the side wall of the envelope, then joining the covering plate to the capacitive element in particular by welding;

secondly positioning a cover comprising a covering wall on the intermediate connection part such that the covering wall covers the end of the envelope and forms one of the two bottom walls of this envelope and joining the peripheral skirt of the intermediate connection part to the side wall of the envelope and to the cover so as to allow deformation of the bottom wall relative to the intermediate connection part, in particular by gluing, brazing or welding, the covering plate of said intermediate connecting part being devoid of securing regions with the cover, these steps being performed so that the intermediate connection part is placed between the capacitive element and the cover, and so that the peripheral skirt of the intermediate connection part partly covers the side wall of the envelope.

\* \* \* \* \*

UNITED STATES PATENT AND TRADEMARK OFFICE
CERTIFICATE OF CORRECTION

PATENT NO. : 9,633,799 B2  
APPLICATION NO. : 14/241441  
DATED : April 25, 2017  
INVENTOR(S) : Philippe Azais and Erwan Vigneras Page 1 of 1

It is certified that error appears in the above-identified patent and that said Letters Patent is hereby corrected as shown below:

In the Claims

Column 11, Claim 11, Line 5, please delete "thefts" and insert --its--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*